Jan. 3, 1928.　　　　　　　　　　　　　　　　　　　1,654,867
C. G. H. DE LAVAL
ADJUSTABLE ELECTRICAL CONDENSER, RESISTANCE, VARIOMETER, AND THE LIKE
Filed June 4, 1924
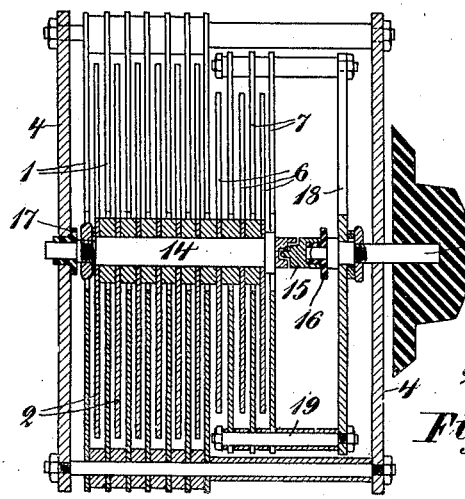
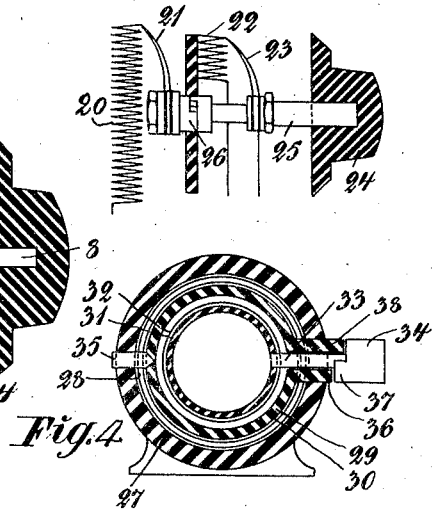
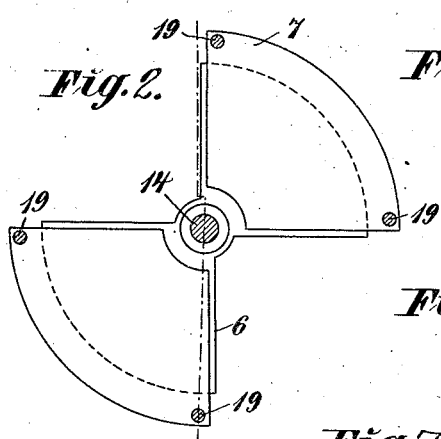
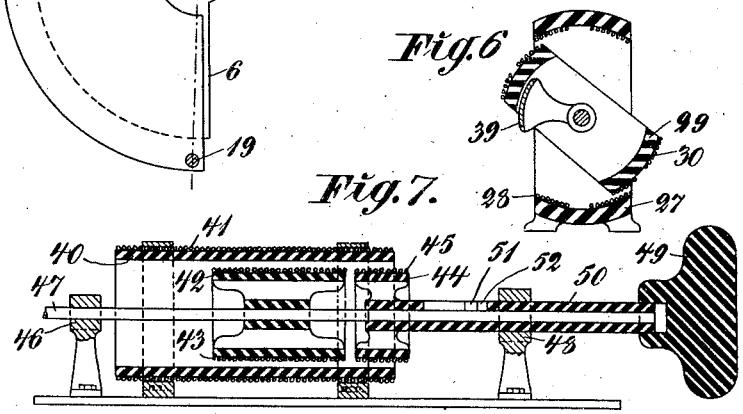
Inventor
C. G. H. de Laval
By Marks v Clerk
Attys.

Patented Jan. 3, 1928.

1,654,867

UNITED STATES PATENT OFFICE.

CLAUDE GUSTAF HJALMAR DE LAVAL, OF STOCKHOLM, SWEDEN.

ADJUSTABLE ELECTRICAL CONDENSER, RESISTANCE, VARIOMETER, AND THE LIKE.

Application filed June 4, 1924, Serial No. 717,884, and in Sweden October 25, 1923.

The circuits of known transmitting and receiving plants for wireless telegraphy or telephony comprise among other devices, fixed or variable resistances, fixed or variable condensers, fixed or variable induction apparatus or so called variometer. It is sometimes necessary to obtain an exceedingly exact adjustment, and for this purpose rotatable condensers are used, comprising a small condenser which is connected in parallel with a large or main condenser and which is used for fine adjustment. According to one known construction the plates of the said condensers are mounted in two coaxial sets, viz, a main set and an auxiliary set, the movable plates of the sets respectively being mounted on two shafts between which a lost motion device is provided so that the movable plate or plates of the auxiliary set may be rotated by means of a handle provided on its shaft without the movable plates of the main set being actuated, until the movable plate of the auxiliary set have been rotated in the one or the other direction through an angle corresponding to the said lost motion. Consequently the said arrangement renders possible the adjustment of the plates of both sets by means of a single handle, so that the adjustment may be effected rapidly. However, when it is desired to obtain a larger capacity than the auxiliary set of plates is able to effect, the movable plates of the main set must be introduced into the spaces of the fixed plates of the same set to a certain extent and then the movable plates of the auxiliary set will extend outside the spaces between the corresponding fixed plates of the auxiliary set and consequently will counteract the action of the plates of the main set. It follows that if the handle is then turned in the opposite direction in order to reduce the total capacity of the condenser, the movable plates of the auxiliary set will at first re-enter between the corresponding fixed plates of the auxiliary set and thereby increase the said total capacity instead of reducing the same. Consequently, in condensers of the said type the plate or plates for effecting the fine adjustment operate only between certain limits in such a manner, that when the rotary direction is reversed, immediate changes of capacity in opposite directions are effected. In many cases, however, it may be desired, that the minutely adjusting plate or plates effect a retroacting adjustment automatically in any position of the plates of the main set.

The present invention relates to a condenser arrangement which renders possible such an adjustment. The same arrangement may also be used in variable resistances and variometers.

To this end there is provided according to the invention apparatus for varying the capacity or the resistance, etc., of an electric circuit, which apparatus includes a main portion comprising relatively movable elements, an auxiliary portion comprising elements which are relatively movable and also movable together, a lost motion device disposed between the elements of the auxiliary portion and a single operating member all so arranged, that, when the operating member is moved an element or elements of the said auxiliary portion are first moved to adjust the capacity or resistance, etc., of said auxiliary portion until the said lost motion has been taken up, whereupon continued movement of the operating member in the same direction will cause all the elements of the auxiliary portion to move as a whole while a relative shifting of the elements of the coarse adjustment simultaneously is effected, movement of the operating member in the reverse direction then actuating only an element or elements of the auxiliary portion to effect a fine retroacting adjustment by said auxiliary portion.

In the accompanying drawing—

Figure 1 is a vertical section of a condenser, provided with rotatable plates and arranged in accordance with this invention.

Figure 2 is a side view of the plates of the auxiliary or minor set of the condenser.

Figure 3 illustrates diagrammatically the invention applied to an adjustable resistance.

Figures 4 and 5 show in two sections perpendicular to one another a variometer provided with two turnable conductors and arranged in accordance with this invention.

Figure 6 shows in a vertical section a modified form of the said variometer.

Figure 7 shows in vertical longitudinal section and diagrammatically a variometer, provided with two slidable conductors and arranged in accordance with this invention.

In Figs. 1 and 2 1 are the fixed plates of the main set and 2 are the rotatable plates thereof, fixedly mounted to a shaft 14. To the shaft 14 the plates 6 of the minor set are also fixed. The spindle 8 is in contact with the frame 4 and between the spindle and a coupling member 15, co-operating with the shaft 14, an insulation 16 is provided. The opposite end of the shaft 14 is journalled in a bush 17 of non-conducting material and fixed in the frame 4. Between the coupling member 15 and the shaft 14 a play of for instance 90° is provided. Spindle 8 carries by means of arms 18 or the like fixed to the same, the plates 7, which co-operate with the plates 6 of the minor set. Plates 7 are fixed to rods 19 projecting from the said arms 18. Each plate 6 and 7 may comprise two quadrants located diametrically opposite each other, as shown in Figure 2. Plates 1 and 2 on the other hand may be semi-circular, as usual.

Assuming, that the plates 2 and 7 are situated entirely outside the spaces between the plates 1 and 6 respectively, it will be found that if the spindle 8 is rotated to the left, the plates 7, owing to the play between the coupling member 15 and the shaft 14, will firstly move into the spaces between the plates 6 and gradually increase the capacity of the apparatus. As the plates 7 have entered into the spaces between the plates 6 to their full extent, Figure 2, the said play has been spent, so that during the continued turning of the spindle 8 the shaft 14 together with the plates 2 and 6 partake in the motion of the spindle and the capacity is further increased by the plates 2, while the plates 6 and 7 move together and effect no change in the capacity. If then the capacity has become too great, the spindle 8 is turned in the opposite direction and now instantly moves the plates 7 gradually out of the spaces between the plates 6, so that the capacity is reduced. If it is necessary to return the spindle 8 for such a distance, that the plates 7 are moved out of the spaces between the plates 6 to their full extent, the spindle brings with it the plates 6 during the continued turning of it, while the plates 2 are moved gradually out of the spaces between the plates 1. If it is necessary to again turn the spindle to the left, a minute adjustment in the opposite direction will then be effected instantly by the plates 7. Consequently, whichever position the plates 6 and 7 occupy a retroacting minute adjustment may instantly be effected by turning the spindle in opposite direction.

In the variable resistance, shown in Figure 3, 20 designates the main resistance, 21 the rotary contact lever of same, 22 a resistance for effecting a minute adjustment and 23 the movable contact lever of same. Lever 23 is fixed to a spindle 25 provided with a handle 24. Resistance 22 and lever 21 are fixed to a short rotary shaft 26 and are electrically connected with one another. A (claw-) coupling, operating with a certain amount of play, is provided between the spindle 25 and the shaft 26.

By rotating the spindle 25 the contact lever 23 may first be shifted and the resistance 22 adjusted. After the spindle 25 has been rotated through a sufficient angle, it rotates with it the resistance 22 and the contact lever 21, so that the resistance 20 is also adjusted. A minute adjustment in the opposite direction may then be effected by rotating the spindle 25 in the opposite direction, during which operation at first only the lever 23 accompanies the spindle and the resistance 22 is adjusted. As perceived from the above a retroacting minute adjustment may be effected in any position of the contact lever 21. The invention may be applied in an analogous manner to variable resistances provided with slidable contact levers, as easily understood by those skilled in the art.

When applying this invention to variometers the latter are provided, in addition to the ordinary turnable conductor, with a second turnable conductor, located, for instance, inside the conductor first mentioned. Figures 4 and 5 show a variometer of the said construction. 27 is the frame of the variometer and 28 its fixed conductor. 29 is the rotor provided with the conductor 30. Inside the said rotor a second rotor 31 is located, provided with the conductor 32. Conductors 28, 30 and 32 are connected by flexible conductors in series or in parallel as may be suitable in each case. Rotor 31 is fixed to a shaft 33, provided with a handle 34. The trunnions 35 and 36 of the rotor 29 are journalled in the frame 27. Trunnion 36 is tubular and the shaft 33 of the rotor 31 extends through the same. A claw-coupling 37, 38 is provided between the shaft 33 and the trunnion 36, which permits a play between the said shaft and trunnion, so that the conductors 30 and 32 may be adjusted simultaneously by means of the handle 34 or the conductor 32 may be shifted separately for effecting a fine adjustment.

The variometer shown in Figure 6 differs from the variometer shown in Figures 4 and 5 only by a substantially spoon-shaped metal plate 39 or the like being substituted for the rotor 31 with the conductor 32. Conductors 28 and 30 may be connected in series, for instance, by means of a flexible conductor in the ordinary manner. Conductor 30 may be connected with the shaft of the plate 39, with which shaft the plate 39 is in contact and to which one of the outer lines is connected. Conductors and metal plate may, however, be connected in any other necessary manner. Conductor 30 and plate 39 may be adjusted in just the same manner as the conductors 30 and 32 shown in Figures 4 and 5. Plate 39, when rotated, changes the inner capacity of the variometer and, consequently, also the impedance of the apparatus. Conductor 30 and metal plate 39 may be considered as two sections of the movable conductor of the variometer in just the same manner as the conductors 30 and 32. Figures 4 and 5, constitute sections of the movable conductor of the variometer shown in the said figures.

In the variometer shown in Figure 7 in addition to the ordinary carrier 42 of the inner conductor 43, a carrier 44 of a second conductor 45 is slidably mounted inside the outer, cylindrical carrier 40 of the outer conductor 41. Carrier 42 is fixed to a shaft 47 slidable in a bearing 46 and extending into the tubular shaft 50 of the carrier 44, which shaft 50 is slidable in a bearing 48 and provided with a handle 49. A pin 51, fixed to the shaft 47, extends into a longitudinal slot 52 provided in the shaft 50. Owing to the said connection between the shafts 47 and 50 the conductors 42 and 45 may be shifted by means of the handle 49 simultaneously or the conductor 45 may be shifted alone for the effecting of a fine adjustment of the variometer. Conductors 43 and 45 may, if wanted, be slightly mounted one inside the other.

The invention may obviously be modified in many respects without departing from the limits of same.

I claim:

1. Electrical controlling apparatus for telegraphy and telephony and comprising elements for a coarse adjustment and elements for a fine adjustment of the same, the elements for the fine adjustment being all movable, a lost motion device disposed between the elements of the fine adjustment, an operating member for shifting the elements of the fine adjustment, so that after the fine adjustment has been brought to a maximum or minimum value respectively, dependent on the amount of the said lost motion, the elements of the fine adjustment are caused to move as a whole, and means whereby the coarse adjustment is effected by the said operating member after the said maximum or minimum amount has been gained.

2. In an adjustable condenser for telegraphy and telephony the combination of a main portion comprising a set of fixed plates and a set of movable plates, an auxiliary portion comprising two sets of plates, one set of plates of the auxiliary portion being connected with the movable plates of the main portion, an operating member for shifting the second set of plates of the auxiliary portion, and a lost motion device disposed between the sets of plates of the auxiliary portion, so that by shifting the said operating member the auxiliary portion is first brought to a maximum or minimum amount of adjustment respectively determined by the said lost motion and the plates of the auxiliary portion are then caused to move as a whole together with the movable plates of the main portion.

In witness whereof, I have hereunto signed my name.

CLAUDE GUSTAF HJALMAR de LAVAL.